(12) United States Patent
Meissner et al.

(10) Patent No.: US 11,126,063 B2
(45) Date of Patent: Sep. 21, 2021

(54) NONLINEAR OPTICAL CRYSTAL WITH CORRECTED PHASE MATCHING ANGLE

(71) Applicants: Helmuth Ernst Meissner, Pleasanton, CA (US); Huai-Chuan Lee, Albany, CA (US); David Joseph Meissner, San Ramon, CA (US); Da Li, San Ramon, CA (US)

(72) Inventors: Helmuth Ernst Meissner, Pleasanton, CA (US); Huai-Chuan Lee, Albany, CA (US); David Joseph Meissner, San Ramon, CA (US); Da Li, San Ramon, CA (US)

(73) Assignee: Onyx Optics, Inc., Dublin, CA (US)

( * ) Notice: Subject to any disclaimer, the term of this patent is extended or adjusted under 35 U.S.C. 154(b) by 56 days.

(21) Appl. No.: 16/676,969

(22) Filed: Nov. 7, 2019

(65) Prior Publication Data

US 2021/0141284 A1 May 13, 2021

(51) Int. Cl.
*G02F 1/35* (2006.01)
*G02F 1/355* (2006.01)

(52) U.S. Cl.
CPC .......... *G02F 1/3544* (2013.01); *G02F 1/3551* (2013.01); *G02F 2203/11* (2013.01)

(58) Field of Classification Search
CPC ........... G02F 1/3551; G02F 2001/3544; G02F 2203/11
See application file for complete search history.

(56) References Cited

U.S. PATENT DOCUMENTS

| | | | | | |
|---|---|---|---|---|---|
| 5,846,638 | A | * | 12/1998 | Meissner | B32B 17/00 |
| | | | | | 428/220 |
| 5,930,331 | A | * | 7/1999 | Rentzepis | H01J 35/22 |
| | | | | | 378/119 |

(Continued)

OTHER PUBLICATIONS

M. L. Rico et al., Continuous-wave dual-wavelength operation at 1062 and 1338 nm in Nd3+:YAl3(BO3)4 and observation of yellow laser light generation at 592 nm by their self-sum-frequency-mixing, Optics Communications 282 (2009), 1619-1621 (Year: 2009).*

(Continued)

*Primary Examiner* — Thomas A Hollweg
*Assistant Examiner* — Mary A El-Shammaa
(74) *Attorney, Agent, or Firm* — Onyx Optics, Inc.

(57) ABSTRACT

A nonlinear optical crystal (NLO) with a phase matching angle that is corrected with a source laser beam for harmonic conversion. The source laser only has to be within a wavelength range depending on the dispersion of the crystal while the crystal is tilted to the calculated expected conversion angle of the source laser as reference. The angle correction is accomplished with a parallel kinematic motion device to which a nonlinear crystal is mounted on a platform, to determine the wavelength- and temperature-specific angle with active laser alignment and subsequent precision resurfacing. The invented phase matching angle correction is applicable to any uniaxial and biaxial NLO crystals in a wide range of wavelengths, e.g., from far ultraviolet to visible to far infrared. It is of most value for NLO crystals of large walk-off and is applicable to any prior art frequency converting architectures.

8 Claims, 10 Drawing Sheets

(56) References Cited

U.S. PATENT DOCUMENTS

| | | | | |
|---|---|---|---|---|
| 6,417,954 B1* | 7/2002 | Reynolds | ................ | C01B 35/12 |
| | | | | 117/3 |
| 7,504,053 B1* | 3/2009 | Alekel | .................... | C04B 35/01 |
| | | | | 252/301.4 R |
| 8,300,305 B2* | 10/2012 | Rytz | ...................... | G02F 1/3551 |
| | | | | 359/328 |
| 9,740,081 B1* | 8/2017 | Kaminski | ............. | G02F 1/3501 |
| 2002/0155060 A1* | 10/2002 | Reynolds | ............. | G02F 1/3551 |
| | | | | 423/624 |
| 2009/0201954 A1* | 8/2009 | Alekel | .................... | G02F 1/353 |
| | | | | 372/6 |
| 2011/0054451 A1* | 3/2011 | Schunemann | ............ | G02F 1/35 |
| | | | | 606/3 |
| 2015/0071316 A1* | 3/2015 | Chuang | ................ | H01S 3/0092 |
| | | | | 372/22 |
| 2017/0315456 A1* | 11/2017 | Lin | ...................... | H01S 3/0092 |
| 2019/0018301 A1* | 1/2019 | Kolis | ........................ | G02F 1/37 |
| 2019/0056637 A1* | 2/2019 | Paranjape | .......... | G01N 21/9505 |
| 2020/0059060 A1* | 2/2020 | Shaw | ................. | H01S 3/06741 |

OTHER PUBLICATIONS

Stephan P. Velsko, Direct measurements of phase matching properties in small single crystals of new nonlinear materials, Jan. 1989, Optical Engineering 28(1), 076-084 (Year: 1989).*

* cited by examiner

*A*  *B*

NONLINEAR OPTICAL CRYSTAL WITH CORRECTED PHASE MATCHING ANGLE

STATEMENT REGARDING FEDERALLY SPONSORED RESEARCH AND DEVELOPMENT (IF APPLICABLE)

This invention was made with Government support under Contract Number W31P4Q-15-C-0080 awarded by DARPA Technical Office MIPR HR001151062, Issued by U.S. Army Contracting Command-Redstone. The Government has certain rights in the invention.

CROSS REFERENCE TO RELATED APPLICATIONS

Not applicable

BACKGROUND OF THE INVENTION

The present invention relates in general to nonlinear optical (NLO) components and devices, and to lasers and more particularly to laser equipment in which the wavelength of an input laser energy of a solid state or gas or vapor laser is converted to different output harmonic wavelengths using nonlinear optical crystal components.

Different radiation wavelengths are desired for different applications. The radiation spectrum of most solid state lasers is relatively narrow with radiation output peaks occurring at fairly defined wavelengths. Output at the fundamental wavelength of a solid state laser oscillator is restricted by the availability of crystal and glass lasing media that are doped with available dopant ions.

Methods currently exist for generating additional wavelengths by converting the wavelength of a fundamental laser output to different wavelengths.

One technique for generating an output radiation beam having a different wavelength than that generated by the lasing medium is by the use of nonlinear frequency conversion crystals. Specialized NLO crystals have been developed for use with currently available lasing media to provide an output wavelength different from the characteristic wavelength generated by the lasing medium itself. For example, U.S. Pat. Nos. 3,949,323 and 4,826,283, which are hereby incorporated by reference, disclose techniques for fabricating a harmonic crystal for use with lasing media where the crystal is responsive to an input fundamental source wavelength to produce an output harmonic wavelength. Crystals useful for generating harmonic wavelengths include the following types: Potassium titanyl phosphate (KTP or $KTiOPO_4$), Lithium triborate (LBO or $LiB_3O_5$), Beta-barium borate (BBO), Potassium titanyl arsenate (KTA) and similar derivatives of KTP, lithium niobate ($LiNbO_3$) and magnesium-doped $LiNbO_3$ ($MgO:LiNbO_3$), Lithium iodate ($LiIO_3$), $KNbO_3$, Zinc germanium phosphide (ZGP, $ZnGeP_2$), silver gallium selenide ($AgGaSe_2$, AGSe) and others.

In anisotropic media, the direction of wave propagation for an extra-ordinary wave is not generally the same as the direction of the beam propagation. Therefore, the ordinary and extraordinary beams of finite size will not completely overlap over the full length of a non-linear optical (NLO) crystal. The extraordinary beam is said to walk-off the axis of the ordinary beam. The angle ρ is called the walk-off angle and can be of the order of a few degrees and is wavelength-dependent. Frequency conversion efficiency with critically phase-matched crystal orientations in real optical birefringent media with real optical beams is strongly dependent on walk-off because beams that do not physically overlap cannot interact. Only for non-critically phase matched nonlinear optical crystal orientation for frequency conversion does walk-off not become an overriding factor.

While the existence of the walk-off phenomenon is well established, its remedy in a laser system is complicated by three factors when the final goal is to use one NLO crystal without precise angle adjustment in its laser system or more than one NLO crystal in the device architecture:

(i) NLO crystals are cut from crystal boules with a standard facet accuracy for phase matching angles with X-ray orientation capable of orienting to about ±0.2° and when including processing errors during fabrication, the resultant standard commercial facet tolerance of the phase matching angle is often ±0.5°.

(ii) To overcome this facet inaccuracy of the phase matching angle, only one large starting crystal may be used when it is available in sufficient size. This approach has been successful and is contained in X. Mu, H. E. Meissner and HC. Lee, U.S. Pat. No. 8,102,593 B2, X. Mu, H. E. Meissner and H-C. Lee, "Quasi-Noncritical Phase Matched and Contra-Phase Matched Structures", Jan. 24, 2012.

This in general means that any crystal devices produced from individual starting crystals necessarily may be different in facet angle within the tolerance of ±0.5° from each other. This restricts the use of such devices in a production environment where every device should have the same facet angle, e.g. for phase matching.

(iii) Phase matching angles change with temperature and are thereby conditionally also temperature tunable for optimum conversion efficiency, depending on the actual plus or minus deviation of the cut angle from the design angle. In some cases, the cut angle would be tuned by cooling to low temperatures which may cause condensation of water onto the input and output facets with ambient air; in other cases, the operating temperature may be too high to be practical and, frequently, the range of temperature tuning is too limited to tune to the designed cut angle. In addition, every NLO crystal of different cut angle may require a different optimal operating temperature.

There is a need for NLO crystals with consistent phase matching angles for a number of electro-optics applications. By way of example, considering a single NLO crystal that is used for harmonic frequency conversion, which is by far the most frequent use of NLO crystals, it is adjusted in the actual system for highest conversion efficiency in a fixture that allows tilting and rotation. It would be more cost-effective if a simple mount could be used that does not require adjustment but instead is inserted at maximum output and at a predetermined operating temperature.

The need for NLO crystals with predetermined phase matching angles in a system design is even greater when more than one NLO crystal is included in an electro-optics device. By way of example, high power harmonic conversions in the mid-infrared, near infrared and the ultraviolet spectral ranges require large apertures where the cross section of a single grown boule is insufficient and crystals of at least two boules or boule sections have to be harvested and combined in alignment of their phase matching angles and crystallographic axes. Examples of NLO crystals of interest in the mid-infrared include Zinc germanium phosphide (ZGP, $ZnGeP_2$), in the near-infrared Lithium triborate (LBO or $LiB_3O_5$) and for conversion from visible to ultra-violet Beta-barium borate (BBO, $\beta$-$BaB_2O_4$) and caesium lithium borate (CLBO, $CsLiB_6O_{10}$). There is no known technique of sufficient accuracy available to orient and correct two or more of these NLO starting crystals such that they result in conversion as if they were a single crystal after being aligned and optically or otherwise bonded. Optical bonding may consist of optical contact with or without subsequent heat treatment or pressure application to fortify the bond.

Another example of combining two or more NLO crystals are devices with walk-off compensated (WOC) stacks consisting of at least one NLO doublet and needing to be corrected to enable predictable performance and operating conditions. A prominent example is BBO where lack of a technique to have crystal components with predetermined and known phase matching angle facets hinders their use as WOC stacks for commercial applications.

Due to the lack of availability of NLO crystals of accurate phase angle facets and lack of a method of producing these, the prior art has resorted to tuning each crystal individually for optimum conversion efficiency, as is described in U.S. Pat. No. 6,137,624, Taira, "Nonlinear optical wavelength converting device". Not only has to be instrumentation available in this described system of individually changing the crystal orientation, it also precludes the potential of bonding of two or more crystals into a compact structure that is less prone to misalignment and environmental conditions such as humidity.

BRIEF SUMMARY OF THE INVENTION

One object of the present invention is to overcome these deficiencies by correcting the phase matching angle of a NLO crystal that by way of example could be employed for second harmonic generation of a source laser radiation for producing WOC stacks of NLO crystals operating at a predetermined temperature. In the specific case where acceptance angles are small and the walk-off angle is large, as is the case for BBO, it appears not possible to obtain crystals of sufficiently accurate cut facet angles for making WOC stacks involving stack components from more than one original crystal. While just using one original crystal, with KTP as specific exemplar NLO crystal, and cutting it into e.g. two or four components would result in exactly the same crystal orientation, as has been disclosed in U.S. Pat. No. 8,102,593 B2 to Mu et al., but the operating temperature would still be undesignable. Instead, the optimal temperature of frequency conversion would depend on whatever the actual crystal cut is within the error of harvesting the crystal from the grown boule which is within about ±0.5°. Employing a single KTP starting crystal of sufficient size is operational for producing a WOC stack for a laboratory demonstration of the potential benefits of WOC, because its acceptance angle is relatively large and temperature tuning relatively wide. However, this approach would result at best in inferior performance if selected individual KTP crystals of nominally same phase angle were used, in comparison to KTP crystals of corrected phase angle. On the other hand, BBO as a representative of a crystal of wide phase matching range, high laser damage resistance, large nonlinear optical coefficient $d_{eff}$, but narrow acceptance angle and large walk-off would not be possible to optimize for conversion efficiency.

Another object of the present invention is to correct the phase matching angle at a wavelength that is not readily available for the correction procedure, possibly due to the nonexistence of the laser system generating that wavelength at the system design stage or due to the expense of duplicating the laser system for the phase angle correction or due to the difficulty of using the desired source wavelength because the actual laser system may be too small or too complicated to be accommodated in a laboratory correction platform. In essence, the minimum of required information for correcting a given cut angle is the desired operating source wavelength and the NLO crystal being contemplated. The crystal is then oriented using an angular positioning system which allows tilting the crystal to the calculated angle, using listed Sellmeier coefficients, that corresponds to the nominal designed cut angle within the cut angle tolerance that usually is ±0.5° and measuring the maximum second harmonic conversion of a readily available source laser at the desired cut angle.

Two critical aspects of performing the invention are an accurate means of positioning the NLO crystal or crystals to be corrected. A preferred positioning instrumentation is a 6-axis positioning system of parallel-kinematic design with six degrees of freedom, with typical angle accuracies <0.0003° and translational accuracies of <0.5 μm, and the NLO crystal mounted on a platform for precision finishing with a transfer and correction accuracy of <0.003°. The accuracy of the finishing operation, relying on existing technology, can be kept within 0.003° as well, so the estimated achievable improvement in cut accuracy of the phase matching angle can be in the ratio of about 0.5° to 0.003° to 0.005°, i.e. two orders of magnitude.

Product applications that are enabled by this invention include:

A NLO crystal that is aligned to its phase matching angle within 0.05° to obviate individual alignment fixturing with respect to a source laser beam.

Combining two or more NLO crystals of corrected phase matching angles to increase the aperture for harmonic conversion.

Combining at least two phase angle corrected crystals into one pair in a walk-off compensating orientation that compensates the inherent walk-off of a NLO crystal. Whereas the theory of WOC has been published and patented throughout more than three decades, they all appear to be deficient of the use of phase angle corrected NLO crystals beyond the accuracy obtained from the crystal grower. Therefore, the experimental and commercial potential as WOC stacks has not been realized. It is an object of the present invention to enable WOC stacks of at least one doublet with all starting crystals of the same designed phase matching angle.

Potentially, there may be other conceivable approaches to determine the orientation of a NLO crystal, by way of example by advanced X-ray equipment but it may become prohibitively expensive and one still would have to develop a technique to transfer the X-ray measuring accuracy to the finishing platform for angle correction. The best conventional X-ray orientation is accurate to about ±0.02°. Apart from this challenge, it appears to be intrinsically preferable to actively orient a NLO crystal with a source laser for harmonic conversion as function of orientation. Serial-kinematic instrumentation may also be employable for orientation but is less reliable and with a lower dynamic range than parallel-kinematic hexapods.

BRIEF DESCRIPTION OF THE SEVERAL VIEWS OF THE DRAWING

FIG. 7A illustrates using a single starting plate of AR/AR coated BBO to produce a doublet which still has its original AR coating remaining on the input and output facets. FIG. 7B then proceeds to start with a WOC doublet to form a WOC quadruplet.

FIG. 9A illustrates the walk-off seen through a singlet BBO crystal using a measuring microscope.

DETAILED DESCRIPTION OF THE INVENTION

Spatial walk-off is a well-known effect in nonlinear optics that limits conversion efficiency and converted laser beam quality. The cut angle accuracy of a supplied NLO crystal is conventionally quoted by crystal growers as ±0.5°. If the NLO crystal has a small acceptance bandwidth that causes only a portion of the pump beam to be used for the nonlinear process, this invention provides crystals with accurate phase matching angles for harmonic conversion and opens up a range of products of consistent performance for which all or most of the theory assuming a perfect phase matching angle cut crystal or crystals has been published already over decades. The invention is illustrated and explained with BBO as primary example which has both a low acceptance angle and large walk-off but is a very useful crystal because it has a broad phase matchable range, a high laser damage threshold, a wide range of transmission between 190 nm and 3500 nm and a large second harmonic generation coefficient $d_{effective}$. Example 1 describes the case where the source wavelength for measurement is different from the source wavelength in the laser system where the BBO crystal in intended to be inserted for second harmonic generation (SHG).

Example 1 Phase Angle Correction of BBO Cut for 473 nm to 236.5 nm SHG Using a 532 nm Laser Source In many practical circumstances, the source wavelength is not available for orientation correction of the NLO crystal. Since BBO is the crystal of choice in many instances, especially when SHG from the visible to the ultraviolet, the orientation and WOC is demonstrated using a 532 nm source laser for correcting BBO that has been cut for 473 nm to 236.5 nm conversion with an initial angle error of ±0.5°.

Figure 1:
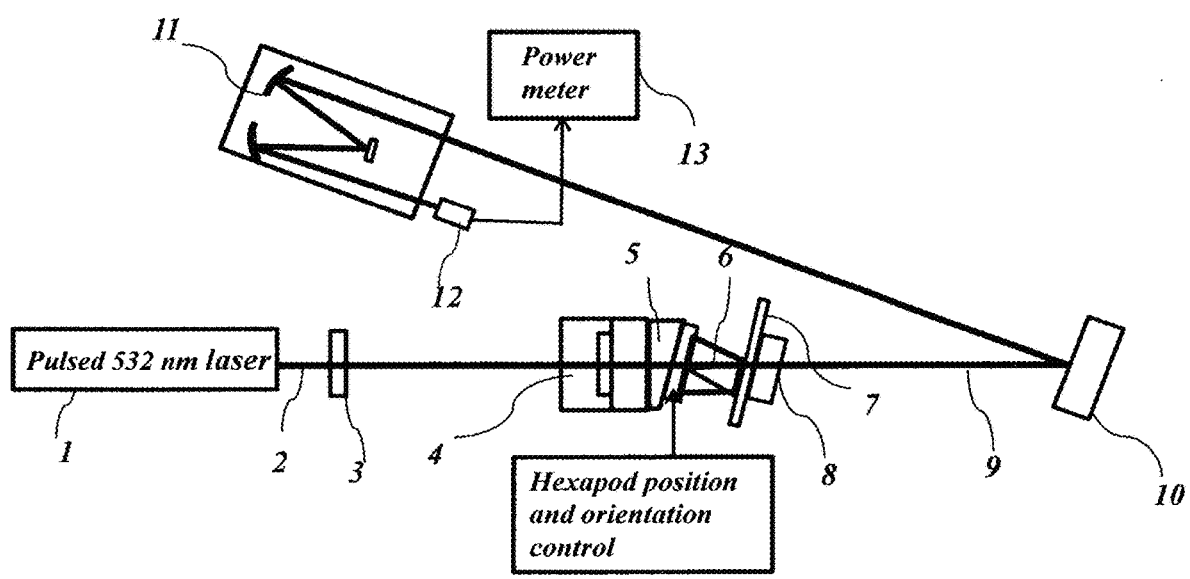
FIG. 1 shows schematically a measuring setup that includes a pulsed 532 nm source laser as pump, beam steering optics, a half wave plate, a mounting platform for a BBO crystal on a high precision 6 axis hexapod, and a monochromator/detector assembly for 266 nm UV radiation detection.

As schematically illustrated in FIG. 1 in plane view, a pulsed 532 nm laser 1 is placed on a benchtop so the beam size and propagating direction are precisely known. The 532 nm laser beam 2 traverses through a half-waveplate 3 (at 532 nm) and through an aperture of a 90° angle block 4 and a 16.5° precision wedge 5 to which a hexapod 6 is mounted. The BBO crystal 8 is positioned on an apertured correcting platform 7 that is attached to the hexapod in a position that assumes that the BBO cut is perfect. The beam traverses the BBO crystal 8 and is converted to 266 nm radiation 9. It is then directed through a mirror 10 into a monochromator 11 that is tuned to the expected SHG 266 nm wavelength of the 532 nm source laser where a detector 12 and a power meter 13 detect and measure the level of the UV signal.

Figure 2:
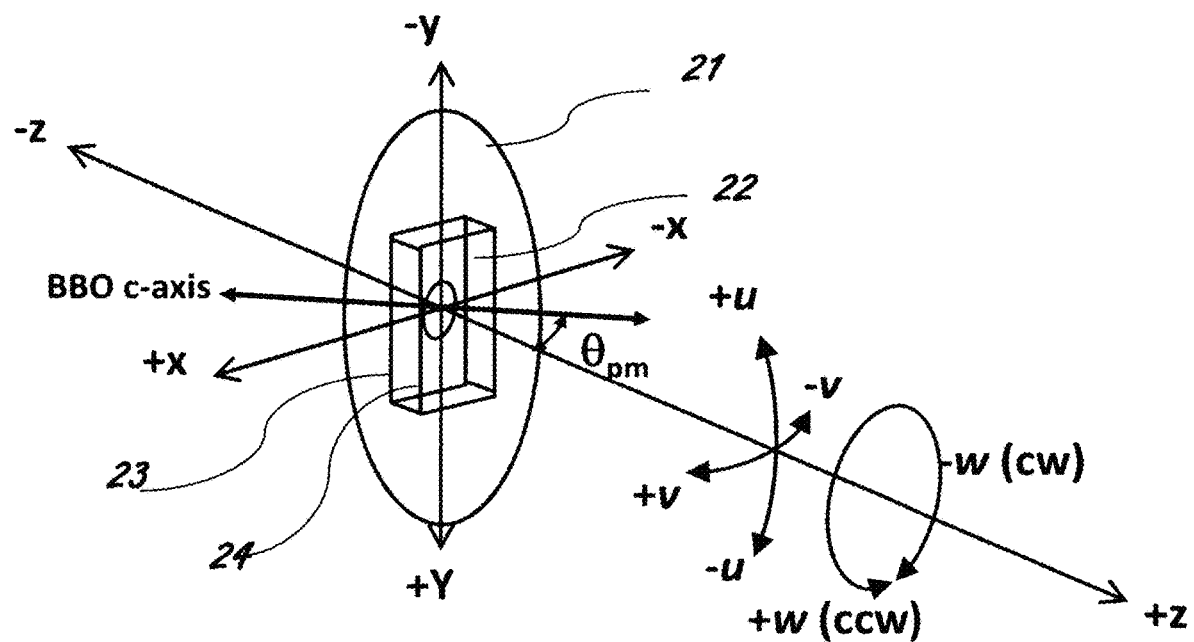
FIG. 2 shows a hexapod coordinate system which defines the linear and angular position of a BBO crystal mounted on a fixture attached to the hexapod that can be tuned according to the power meter feedback to optimize the BBO alignment to the phase matching direction with respect to the source laser beam.

A critical component in realizing the measurement and subsequent correction accuracy of the cut angle error is a precision parallel six-axis positioning hexapod Model H-812, manufactured by Physik Instrumente, with three translational degrees of freedom in X, Y and Z, and three rotational degrees of freedom in u, v and w. The hexapod has an angle tuning resolution of 0.0002°. This accuracy is sufficient for orienting BBO with a crystal acceptance angle of ≤0.04°. The hexapod reference coordinates on its mounting face 21 with respect to the properly mounted BBO component 22 are shown in FIG. 2. The hexapod coordinate system defines the three linear X, Y and Z coordinates and the three angular u, v and w positions of the BBO mounted on a correction platform 7 of FIG. 1, attached to the hexapod where the hexapod can be tuned according to the power meter feedback to optimize the BBO alignment to the phase matching direction with respect to the 532 nm source beam. The c-axis of the BBO crystal is located in the XZ plane which defines then the phase matching angle $\theta_{pm}$ as angle between the c-axis and the Z-axis where the +Z is the propagation direction of the laser beam through the BBO crystal and is ideally normal to the large faces of the BBO crystal if both BBO end faces have been corrected. The BBO crystal is mounted on the correction platform which in turn is mounted on the hexapod face mount 21 so that the principal correction of the cut angle is by rotation v around the Y-axis.

Figure 3:
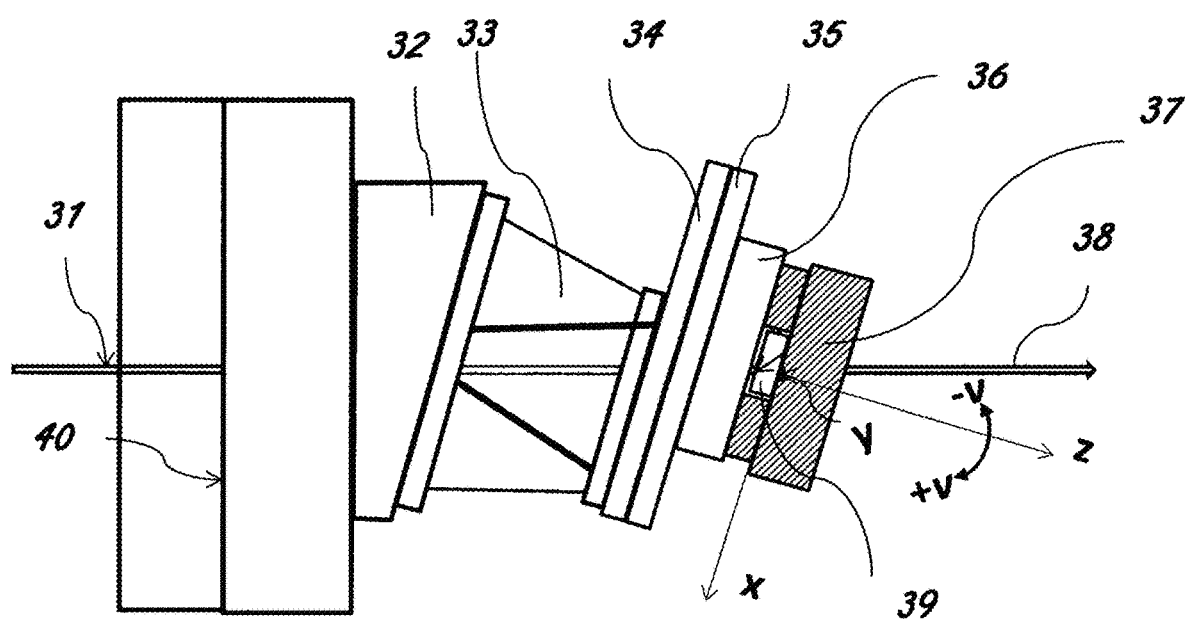
FIG. 3 shows a more detailed schematic of the measurement arrangement with the correction platform and with a BBO crystal mounted on it. The hexapod is rotated along its v rotational axis until an output maximum position has been found. Thereafter, the correction platform is detached and the measured facet is resurfaced.

FIG. 3 illustrates schematically the detailed configuration for measuring the cut angle error of a BBO 37 cut for 473 nm to 236.5 nm conversion using the 532 nm laser beam 31 as the pump source. A wedge 32 of 16.5° is bolted to a precision 90° angle granite block 40 fixed to an optical bench to which in turn a miniature hexapod 33 is attached. Plates 34 and 35 assist in mounting a handle 36 for aligning the correction platform 37 with the BBO crystal 39 located on it. The BBO crystal is aligned with the hexapod coordinate system X, Y Z and only rotation v is shown. Rotation v is performed in and out of the paper plane, corresponding to a rotation parallel about the Y-axis of the hexapod until a maximum in conversion of the 532 nm source beam to 266 nm ultraviolet is found. FIG. 3 also illustrates the requirement for strict parallelism between the hexapod face plate and reference surfaces of components 34, 35, 36, 37 and BBO 39, preferably kept in total to 0.002°.

Figure 4:
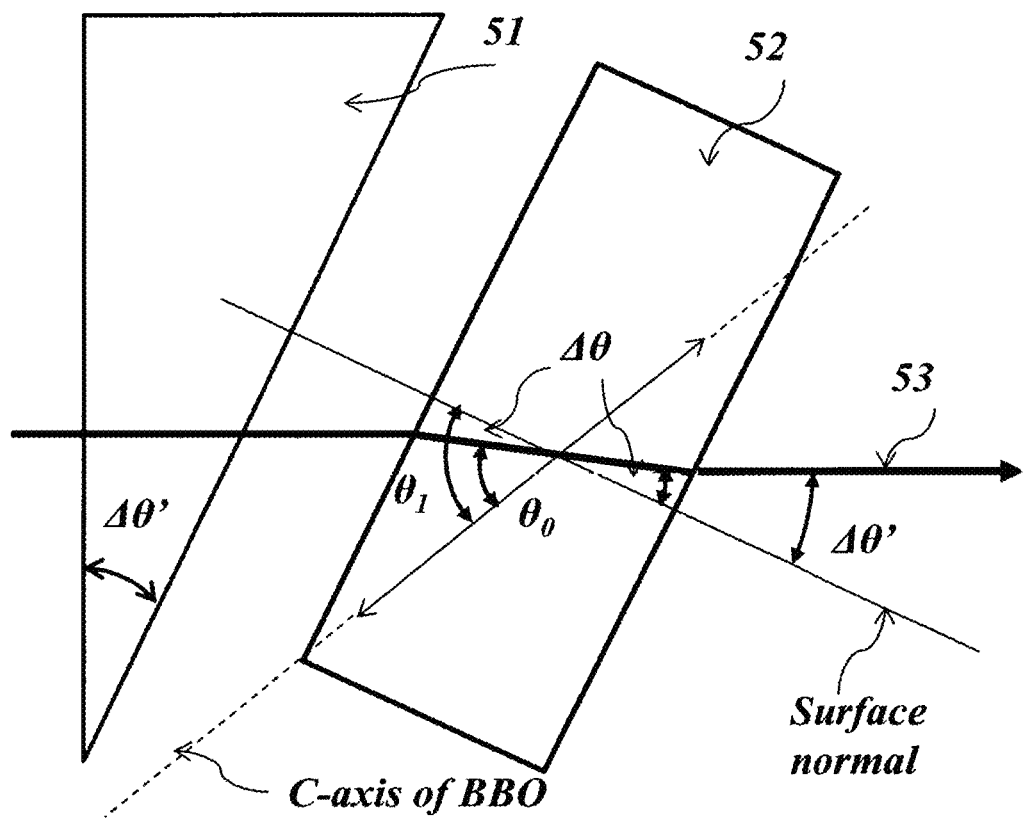
FIG. 4 illustrates in more detail the source laser beam, traversing through an aperture in a wedge and the correction to be made for the refraction of the beam in the BBO crystal according to Snell's Law.

More detail is provided in FIG. 4 for correction of the phase matching angle error. Keeping the laser position 53 fixed, one implements an external wedge 51 of $\Delta\theta'$ to accommodate for the phase matching angle difference $\Delta\theta$ between 532 nm and 473 nm. Using a readily available 532 nm laser for correcting a 473 nm to 236.5 nm cut BBO crystal 52, one finds the phase matching angle difference $\Delta\theta = +9.8°$, compared to that of the 532 nm to 266 nm conversion. However, one needs to make a wedge that includes the refraction of the 532 nm source beam traversing through BBO at the phase matching angle of 9.8° relative to the phase matching angle for the 532 nm beam. The refraction-compensated incident angle, according to Snell's law is $\Delta\theta' = \sin^{-1}(n*\sin(\Delta\theta)) = 16.56°$ with the refractive index of BBO of 1.674. In this case, since the magnitude of the compensated angle is beyond the hexapod v turning range, one has to insert an apertured physical planar wedge 51 of +16.56° for compensating the refraction that is attached to the 90° angle block 40 of FIG. 3. The 532 nm source laser 53 traverses through an aperture in the 16.56° wedge 51 and through open space and apertures in the hexapod and the fixturing plates shown in FIG. 3 and then encounters the surface of the BBO 52 at an angle $\Delta\theta'$, then refracts in the crystal by $\Delta\theta$ and exits again parallel to the optical bench with a portion of the 532 nm laser converted into 266 nm radiation. One uses a reference such as a precision right angle block of the mounting fixture to align the laser beam at normal incidence to the BBO surface. Given that the BBO crystal has been cut for the 473 nm to 236.5 nm Type I conversion in which the normal incident direction s will be parallel to the phase matching direction that forms the phase matching angle of $\theta_1$ (=57.5°) with respect to the c-axis of BBO. With the test laser wavelength at 532 nm, one has to align the beam direction 53 within the BBO to be at the phase matching angle of $\theta_0$ (=47.7°) with respect to the c-axis for 532 nm to 266 nm Type I conversion. As the difference between the two being $\Delta\theta = \theta_1 - \theta_0 = +9.8°$, we have to rotate the BBO an angle of $\Delta\theta' = \sin^{-1}(n_2*\sin(\Delta\theta)) = +16.56°$ to accommodate for the refraction effect.

Analogously to the 473 nm to 236.5 nm cut angle correction, a BBO crystal designed and cut for 465 nm to 232.5 SHG conversion is corrected with the same 16.56° wedge. One finds the phase matching angle difference $\Delta\theta$ is 11.6° compared to that of 532 nm to 266 nm conversion. One requires a wedge that compensates for the refraction that allows for the pump beam to traverse through the BBO crystal at the phase matching angle of 11.6° relative to the phase matching angle for the 532 nm beam. The compensated incident angle $\Delta\theta' = \sin^{-1}(n*\sin(\Delta\theta)) = 19.67°$. Since the magnitude of the compensated angle is not too different from that for 473 nm to 236.5 nm conversion, one can still use the physical plane wedge 32 of 16.56° from FIG. 3 for compensating 16.56° of the 19.67° and the remaining difference of 3.11° will be compensated by the tuning angle v of the hexapod. Once the total external wedge of 19.67° is compensated, one sets the hexapod position as the initial angular position reference of $v_0$ and $u_0$. The difference between the maximum converted power to 266 nm $v_{max}$ and $v_0$ is the apparent cut angle error of $\Delta\theta$. Then one corrects $\Delta(v_{max} - v_0)$ to the real cut angle error $\delta$ where $$\delta = \sin^{-1}(\sin(\Delta v)/n_{532\ nm}).$$

Example 2 Phase Angle Correction of BBO Cut for 532 nm to 266 nm SHG Using a 532 nm Laser Source This is an example where the cut angle error is corrected at the design wavelength. The starting crystal is 20 mm×8 mm×3 mm which has been cut for a phase matching angle of $\theta = 47.7° \pm 0.5°$ and $\varphi = 0°$ for conversion of 532 nm to 266 nm. With a walk-off angle of 4.89° and a low acceptance angle tolerance of ±0.04° per 3 mm crystal thickness, the cut angle has to be corrected to ≤0.04° of the phase matching angle before optically bonding it into a four-layered WOC BBO stack. In this particular example, for simplicity of discussion, the cut angle of the crystal is first corrected and subsequently diced into an even number of components. If large enough crystals are not readily available, the cut angles of individual crystal components are corrected prior to bonding, taking care that the $d_{effective}$ nonlinear coefficients of different crystals are aligned.

The correction is performed with a setup that is identical to the one depicted in FIG. 1, except there is no wedge 5 between the angle plate and the hexapod. A 532 nm source laser with its beam parallel to the optical table as support traverses through an aperture through a precision angle block onto which a hexapod is mounted horizontally. The BBO crystal is mounted on a correction platform affixed to the hexapod with an aperture for allowing the source to traverse the BBO crystal to an ultraviolet detection system, consisting of a monochromator 11 and a power meter 13. The maximum output power as function of change of angle is measured and the difference from the theoretical cut angle for SHG conversion is noted.

Procedure-wise, the source beam is aligned at normal incidence to the BBO first by tuning the angular positions u and v of the hexapod until the reflection from the first BBO surface comes back to itself. This defines the initial angular position of the hexapod coordinates $u_0$ and $v_0$. When the hexapod is at this position, the pump beam is collinear with the surface normal of the BBO. The cut angle error $\delta$ is determined by finding the tuning angle v where the generated power reading P(v) is a maximum. We then define $v = v_{max}|_{dP(v)/dv=0}$. Thus, the apparent cut angle error $\Delta v = v_{max} - v_0$. The real cut angle error still has to include the refraction in the BBO crystal which is deduced as $$\delta = \sin^{-1}(\sin(\Delta v)/n_{532\ nm}).$$

Then, a precision wedge corresponding to the cut angle error $\delta$ is included along the x-direction on the correcting platform and the top surface of the BBO crystal is precision finished at the corrected cut angle, by way of example, for a subsequent bonding operation.

Attention has to be placed on all tooling for correction for resurfacing by precision finishing that parallelism of <0.002° on all reference surfaces has to be maintained.

Experimentally, after aligning the hexapod to normal incident position, $v_0$, to BBO, one scans v from $v_0 - 1°$ to $v_0 + 1°$ until finding the peak of the generated power that corresponds to $v_{max}$. To optimize the process, one may make a coarse scan first to find the region of v that show signs of enhanced SHG power then make a finer scan to find the neighborhood of the peak location with higher resolution. One can progressively make finer scale scans to find the peak power direction $v_{max}$ with the desired precision. When a source laser is available at the same wavelength at the nominal cut angle, then the measurement does not rely on the accuracy of the calculated phase matching angle using published Sellmeier coefficients since the measurement and correction are executed on the same BBO front surface as geometric reference.

Another example where the hexapod v rotational range is adequate for correction of the cut angle is the conversion from 515 nm to 257.5 nm. The phase matching angle difference $\Delta\theta=+2.3°$ compared to that of 532 nm to 266 nm conversion. Again, one needs to calculate the external incident angle that compensates for the refraction traversing the air/BBO interface and through the BBO crystal at the phase matching angle of 2.3° relative to the phase matching angle of the 532 nm beam. The compensated incident angle can be calculated following Snell's law: $\Delta\theta'=\sin^{-1}(n*\sin(\Delta\theta))=3.85°$. The magnitude of the compensated angle is within the hexapod tuning range. One resets the initial beam pointing direction on the hexapod $v_0$ to +3.85°. Then, the apparent cut angle error is determined as $\Delta\theta=v_{max}-3.85°$. Then, the actual cut error δ is calculated as before.

Figure 5:
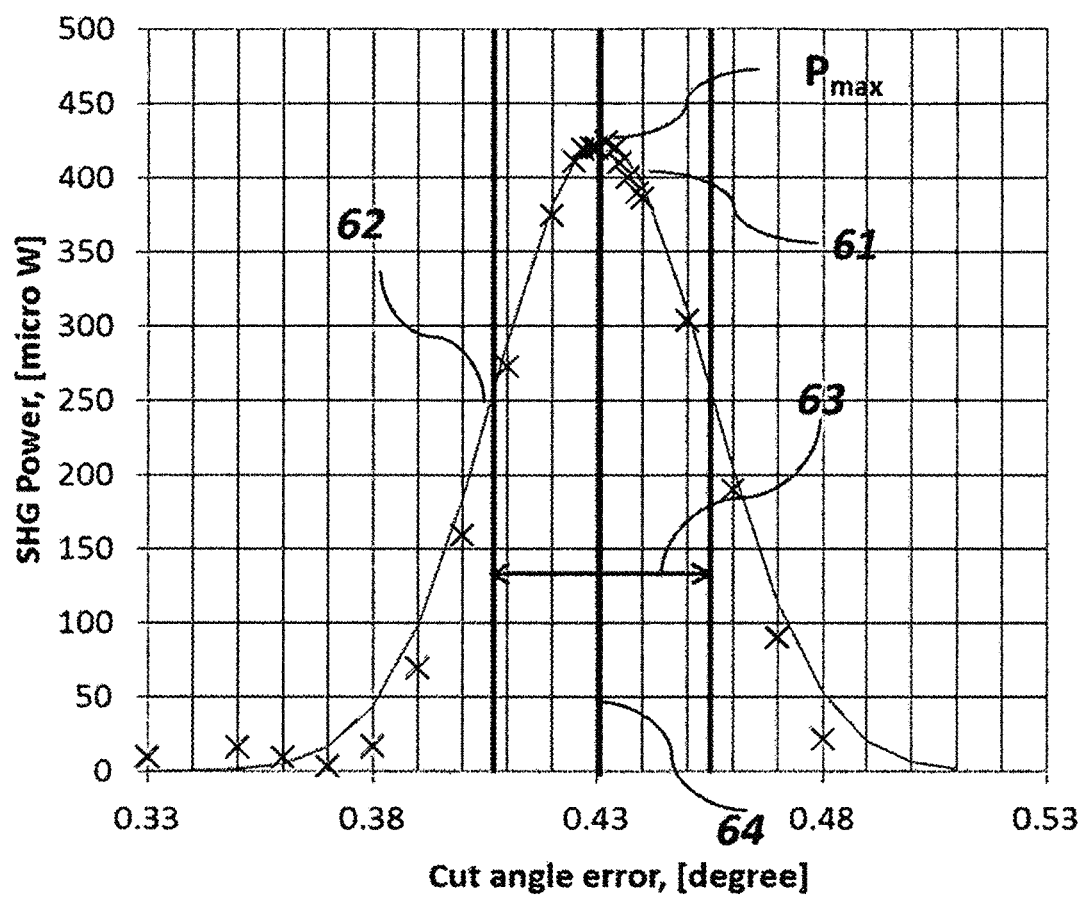
FIG. 5 shows a scan across the rotational axis v, resulting in the determination of the exact phase matching angle through the BBO crystal from the Gaussian curve that is fitted to the data points. This data also provides the deviation of the cut angle from the nominal initial phase matching angle prior to correction and the acceptance angle of the pump laser.

An actual set of data points 61 is shown in FIG. 5. The 266 nm power reading follows a Gaussian distribution 62 with respect to the angle variation Δv. The peak $P_{max}$ and the acceptance angle σ are found by fitting the normal distribution curve:

$$P(v)=P_{max}*\exp(-(v-v_{max})/(2*\sigma^2))$$

Given the acceptance angle 63 of σ=±0.024° for this specific BBO crystal and the apparent cut angle error 64 with $v_{max}$ of 0.431°, it is evident that this BBO crystal, if left uncorrected, is unsuitable for use in a combination of crystals for SHG-operational WOC stacks, even though it is possible to dice it into four individual pieces to be subsequently combined again as a non-functional SHG WOC stack. Temperature tuning will not cover a wide range of cut errors. However, if the crystal is inserted as a singlet into a laser system for SHG, it has to be tilted to be operational.

Determination of Temperature of Operation

Figure 6:
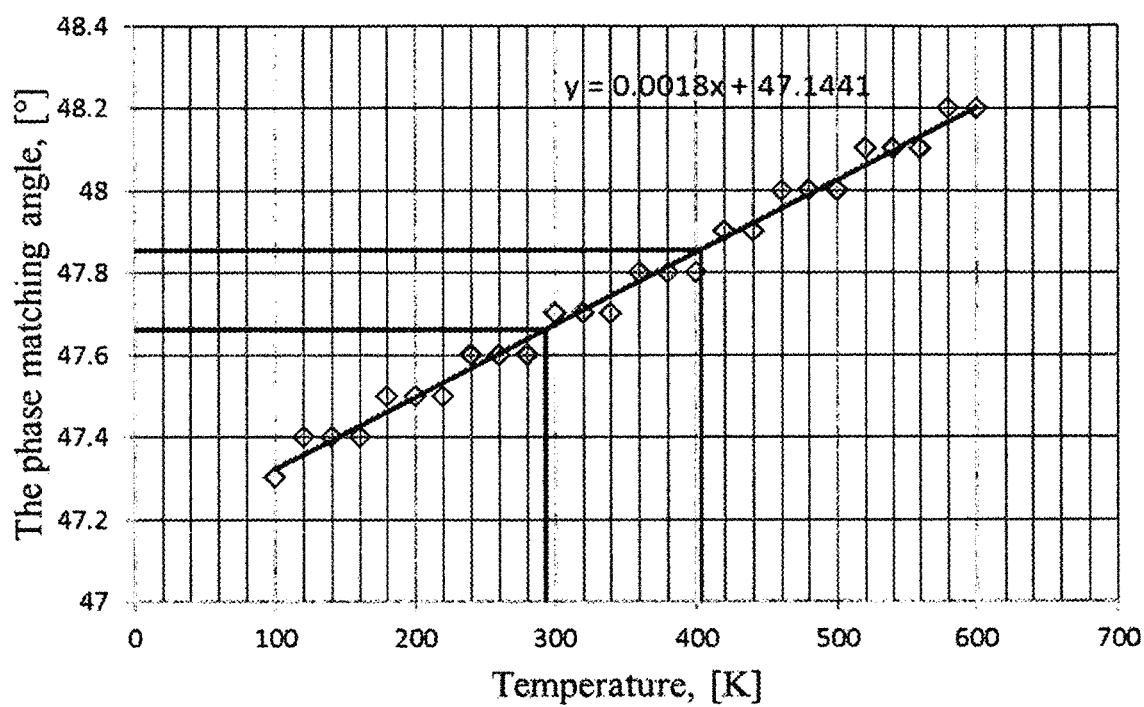
FIG. 6 shows the relationship of the phase matching angle as a function of operating temperature within the range 100 K to 600 K for BBO Type I 532 nm to 266 nm conversion. The data are generated using SNLO open source software.

The present invention of correcting the phase matching angle enables choosing a practical operating temperature for a NLO crystal stack by changing the angle based on its temperature dependence. By way of example, to convert 532 nm to 266 nm with BBO around room temperature via a Type I scheme, one finds the phase matching angle as a function of temperature using open source SLNO software by Arlee Smith of AS-Photonics. The resulting data are plotted in FIG. 6.

The function is linear and the slope is about 0.0018° phase angle change per ° C. of temperature change within a wide operating temperature range.

Since the acceptance angle is only 0.024° for this particular BBO crystal, the SHG operation would have to be within a range of about 13.3° C. Thus, there only is a limited tuning range available by varying the crystal temperature of the stack as shown in the outlined zone of the plot. A more precise than ±0.5° cut crystal is required for allowing a BBO stack to be temperature tuned. Temperature tuning by heating from room temperature to about 100° C. can only allow a cut error of 0 to +0.2° in order to render temperature tuning effective (by heating) within a manageable range. Cooling below room temperature requires the BBO crystal stack to be placed in an enclosure of water vapor-free atmosphere to avoid condensation of water from the vapor phase. In contradistinction to a BBO stack, a single BBO crystal can be phase angle tuned by tilting for optimum conversion at a desired operating temperature but suffers from disadvantages of lower conversion efficiency and beam quality. It is evident from FIG. 6 that a conventional cut error range of 47.66°±0.5° at the limits of 47.11° and 48.16° renders the operating temperature of a BBO stack impractical corresponding to a temperature range of about −100° C. to +277° C. The present invention enables a stack design in a predetermined operating range.

Each NLO crystal has unique properties, such as transparency range, phase matching range, walk-off angle and acceptance angle as function of wavelength and temperature tunability. Some NLO crystals such as LBO have lower walk-off angles and higher acceptance angles. When using a singlet LBO crystal, its cutting angle is readily adjusted by tilting the crystal for optimum frequency conversion. However, when optically bonding two or more LBO crystals into WOC stacks, especially when starting with different starting crystals, there is a need to have them accurately oriented to the same cutting angle due to their large negative coefficient of thermal expansion of $-8\times10^{-5}$/K in the crystallographic Y-direction and large positive expansion of $10.8\times10^{-5}$/K in the X-direction and $3.4\times10^{-5}$/K in the Z-direction. Misalignment of the crystallographic axes with facet angles within tolerances of ±0.5° or even less, depending on the actual phase matching angles, between two crystals may result in failure of the interface bond during heat treatment for bond stabilization. In the case of LBO, correction of the cut angle according to this invention as a first step, followed by X-ray orientation of the crystallographic axes with the corrected phase matching end facets as reference surfaces to an accuracy of about 0.02° results in compatibility of WOC optically bonded architectures.

While the available sizes of NLO crystals such as BBO in commercial laser systems is adequate, there is utility of larger cross sections in institutional systems for conversion into the ultraviolet. The present invention provides a solution by first orienting two, three of more BBO crystals of large available sizes to the same phase matching angle and crystal orientation and subsequently bonding them into a composite structure consisting of the required cross section.

Example 3 WOC BBO Crystal Stack

The present invention enables the manufacture of WOC stacks with predictable conditions of frequency conversion because all crystals of the stack are phase angle corrected for the intended operating conditions. In some applications, it may be desirable to preserve an antireflecting or other optical coating deposited on a crystal during the stack fabrication process. Whereas one procedure is described here in FIG. 7, other options for the end faces are either sapphire or magnesium fluoride with their c-axis orientation perpendicular to the BBO stack end face or faces or actually BBO with a slight misorientation outside of the acceptance angle. Then, BBO will act as an inert crystal but with very small differences in coefficients of thermal expansion and therefore compatible for optical bonding with subsequent heat treatment.

Figure 7:
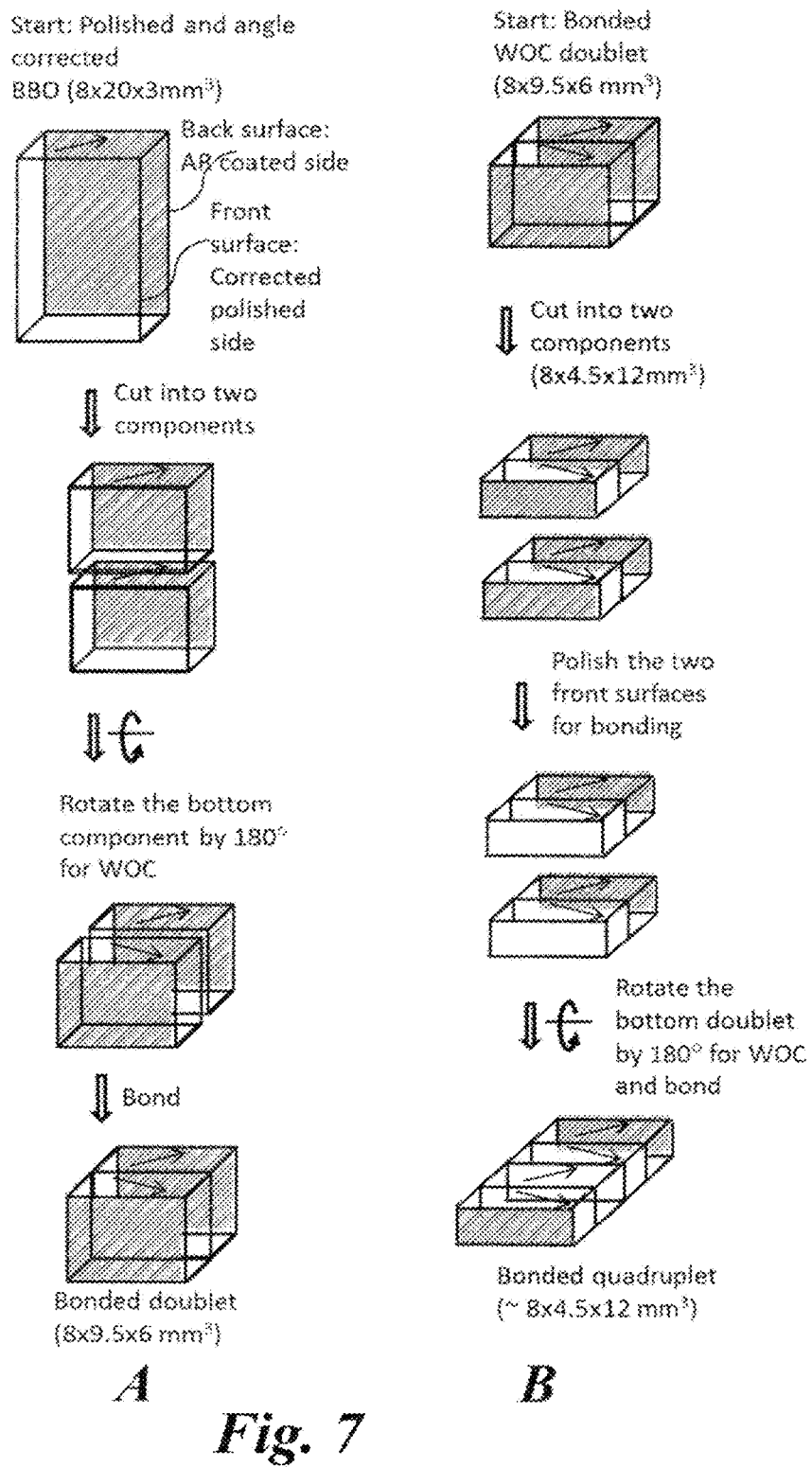
FIG. 7 shows a schematic of forming WOC stacks.

Assuming that the starting crystal has had an antireflecting (AR) optical coating deposited prior to the correction procedure and WOC stack formation, it is possible to retain the AR coatings on the outside surfaces of the doublet or quadruplet, as shown in FIGS. 7A and 7B respectively. Starting out after correcting the cut angle error by precision-resurfacing the top surface on the platform with a one-side corrected BBO and dicing it into two components 71 and 72, the BBO crystal will still retain an AR coating on its back surface, shown hatched in FIG. 7. It is important to note that a unique mark such as a pencil arrow or a beveled corner is helpful in maintaining the proper orientation for WOC of pairs of bonded crystals. The starting crystal of 8×20×3 mm$^3$ is then diced into two equal parts (~8 mm×9.5 mm×3 mm$^3$, 2 each and allowing for a kerf loss of 1 mm)) for bonding and bonded together via their polished sides, with a proper 180° flipping (i.e., about the e-ray polarization direction) (FIG. 7A). The resultant bonded WOC doublet (~8×9.5×6 mm$^3$) has the optical coating on both outer surfaces preserved. Depending on the dicing direction and the starting dimensions of the BBO crystal, a variety of alternative processes is possible. Similarly, FIG. 7B shows one process sequence of producing a WOC quadruplet from a WOC doublet. Again, depending on the directions of dicing, the number of cuts and the dimensions of the starting WOC doublet crystal, a quadruplet, sextuplet or octuplet could be produced by an appropriate modification of the process steps of polishing for bonding and bonding. This described process is cost-effective for laboratory or small quantities of crystal stacks, a more economical production process uses individually phase angle corrected crystals of as large a size as available, bond them for WOC and dice them into smaller cross section for use in a laser system.

Confirmation of WOC

Figure 8:
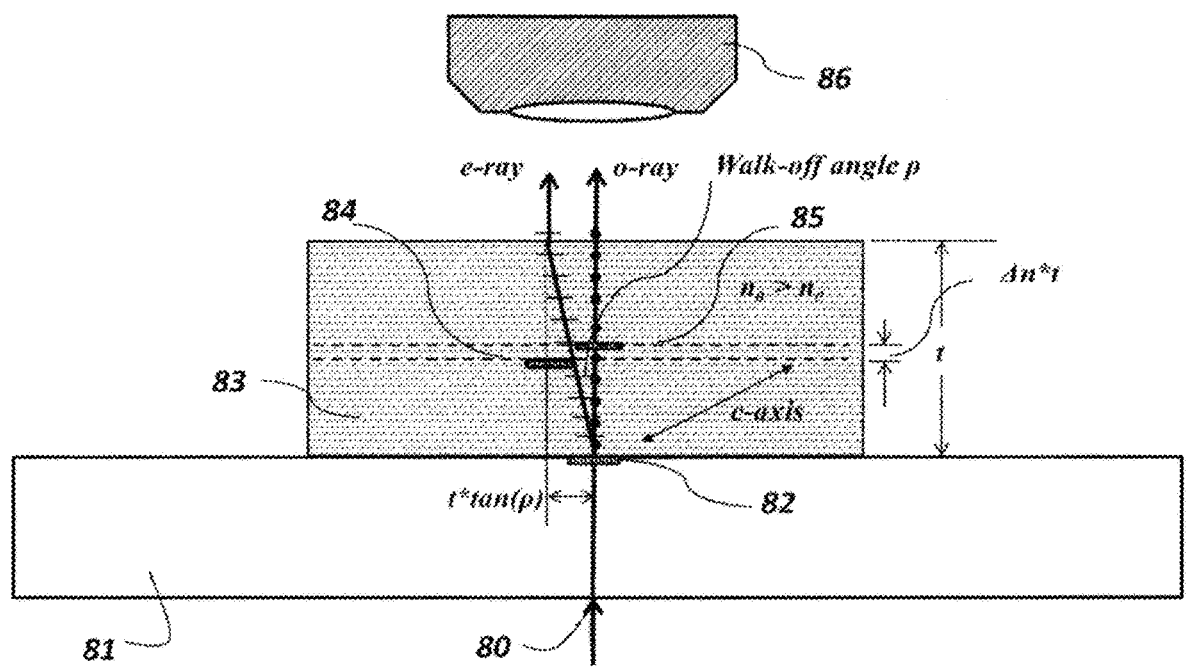
FIG. 8 illustrates how double images are formed and observed in a measuring microscope due to the walk-off effect.

The spatial walk-off effect of a negative birefringent crystal ($n_o$>$n_e$) such as BBO 83 can be visualized by a double image of an object under optical observation. FIG. 8 illustrates the effect when an object such as the scale markings on a reticle 82 is placed on a microscope stage 81 and illuminated, one can observe its double image via a measuring microscope objective 86. With microscope stage illumination 80, the e-ray image 84 is displaced from the o-ray image 85 by a lateral distance of t*tan($\rho$), where t is the BBO thickness and $\rho$ is the specific walk-off angle determined by the inclination angle between the c-axis and the optical axis of the image system and by a vertical distance defined as t*($n_o$−$n_e$), where $n_o$=ordinary ray refractive index and $n_e$=the extraordinary ray refractive index.

Figure 9:
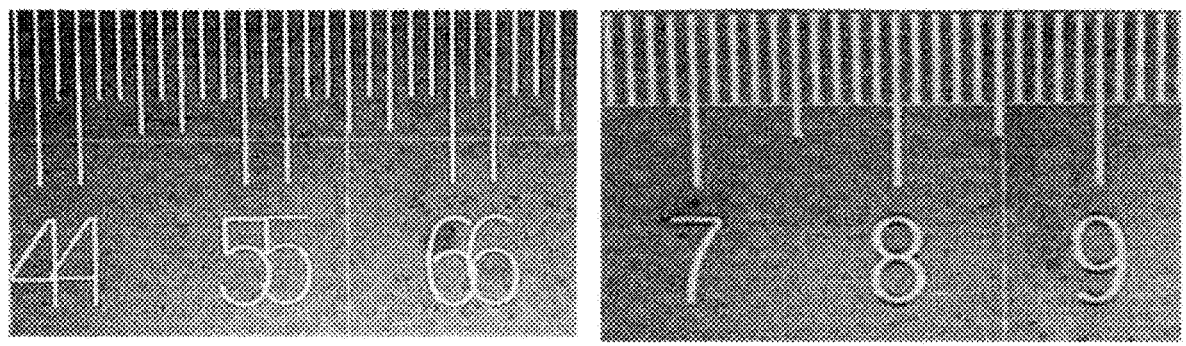
FIG. 9 B confirms that the walk-off has been compensated in the same crystallographic orientation as in FIG. 9 A, as seen through a measuring microscope.

To visualize the walk-off effect and its compensation by a properly stacked BBO quadruplet, we refer to the microscopic images shown in FIGS. 9 A and B. FIG. 9 A shows a double image of the reticle 82 formed through a singlet BBO crystal as the e-ray walks off from the o-ray image. Using the image of a metric reticle (0.1 mm per division) as the gauge, we can calculate the walk-off angle of BBO being 3.58°, given the thickness of the BBO of 3.20 mm and the walk-off distance of 0.20 mm. In contrast, the walk-off compensation of a BBO quadruplet of 12 mm total thickness is confirmed by absence of a double image of a reticle, viewed through the quadruplet using the same settings of the measuring microscope as shown in the photo in FIG. 9 B.

Figure 10:
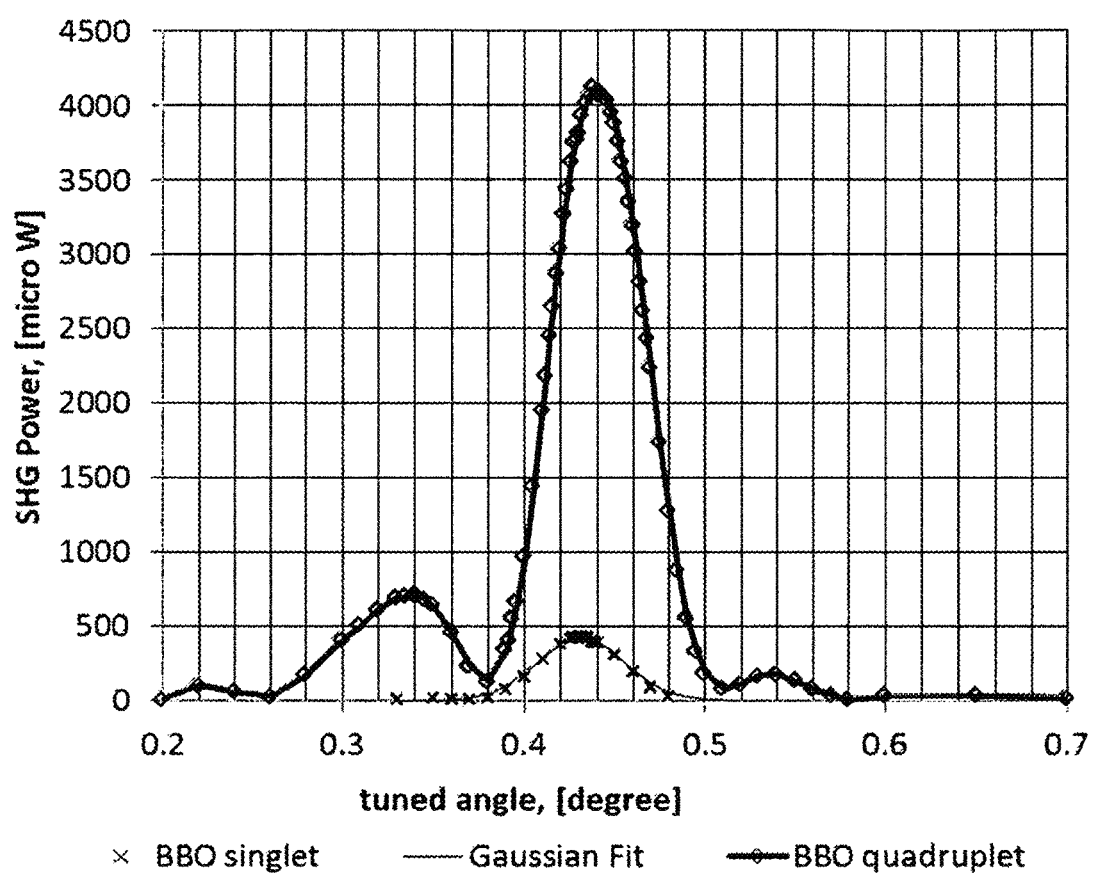
FIG. 10 documents the almost 10-fold increased output of SHG at 266 nm, employing a quadruplet BBO stack from a 532 nm input beam, in comparison to a singlet BBO crystal.

To demonstrate the increased SHG conversion efficiency of a BBO stack in comparison to a singlet BBO crystal, a 532 nm pulsed laser has been employed in a simple one pass experiment. FIG. 10 shows the output of a quadruplet 101 to be almost ten times as high as that of a singlet 102 when measured in an analogous setup. The maximum occurs in both cases at the same expected angular location since the outside surfaces of the quadruplet have not been corrected to preserve the AR coating. The spectral output from a monochromator confirms the SHG conversion to 266 nm.

While the invention has been described by way of examples and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A nonlinear optical (NLO) crystal slab, with two opposing polished crystal faces, where its phase matching angle is corrected to ±0.02°, produced with the aid of a source laser where the wavelength of said source laser second harmonic frequency doubles at an intended custom laser phase matching angle.

2. The nonlinear optical (NLO) crystal slab according to claim 1, wherein the source laser is selected from mid-infrared, near-infrared and visible radiation to correct the phase matching angle of a NLO crystal for harmonic frequency conversion.

3. The nonlinear optical (NLO) crystal slab according to claim 1, wherein the NLO crystal is selected from KTP (KTiPO$_4$), LiB$_3$O$_5$, KNbO$_3$, CsB$_3$O$_5$, BiB$_3$O$_6$, CsTiOAsO$_4$, RbTiOAsO$_4$, ZGP (ZnGeP2), β-BaB$_2$O$_4$, CsLiB$_6$O$_{10}$, LiNbO$_3$, MgO:LiNbO$_3$, AgGaS$_2$, and AgGaSe$_2$ for harmonic frequency conversion.

4. The nonlinear optical (NLO) crystal slab according to claim 1, wherein the phase angle corrected single NLO crystal is inserted into a beam path at 0° angle of incidence into a laser system, obviating the need for any tilt angle alignment or output optimization.

5. Combining two or more NLO crystal slabs that have been corrected according to claim 1 to produce a cross section or length that is beyond the available dimensions of direct crystal growth.

6. The nonlinear optical (NLO) crystal slab according to claim 1, wherein each two layers represent a walk-off compensated doublet that is operational and corrected for the maximum output at the harmonically converted wavelength and for the system operating temperature.

7. The nonlinear optical (NLO) crystal slab according to claim 1 for harmonic frequency conversion from the near infrared to the visible or the visible to the ultraviolet radiation range wherein the crystal is selected from beta barium borate (BBO, P—BaB204) and lithium triborate (LBO, LiB$_3$O$_5$).

8. An optically bonded walk-off compensated BBO crystal stack consisting of at least two crystals from visible to deep ultraviolet radiation, where its phase matching angle is corrected to ±0.02°, produced with the aid of a source laser where the wavelength of said source laser second harmonic frequency doubles at an intended custom laser phase matching angle.

* * * * *